US010740356B2

(12) United States Patent
Rao et al.

(10) Patent No.: US 10,740,356 B2
(45) Date of Patent: Aug. 11, 2020

(54) DYNAMIC INCREMENTAL UPDATING OF DATA CUBES

(71) Applicant: INTERNATIONAL BUSINESS MACHINES CORPORATION, Armonk, NY (US)

(72) Inventors: Suryanarayana Rao, Bangalore (IN); Viren D. Parikh, Bangalore (IN); Ramesh Chandra Pathak, Bangalore (IN); Ramesh Kumar Goel, Balbir Nagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 16/020,246

(22) Filed: Jun. 27, 2018

(65) Prior Publication Data

US 2020/0004868 A1 Jan. 2, 2020

(51) Int. Cl.
*G06F 16/28* (2019.01)
*G06F 16/245* (2019.01)
(Continued)

(52) U.S. Cl.
CPC ........ *G06F 16/283* (2019.01); *G06F 16/2264* (2019.01); *G06F 16/2379* (2019.01); *G06F 16/245* (2019.01); *G06F 16/254* (2019.01)

(58) Field of Classification Search
USPC ....................................................... 707/602
See application file for complete search history.

(56) References Cited

U.S. PATENT DOCUMENTS 7,698,349 B2 4/2010 Hulen et al.
7,720,861 B1 5/2010 Vasudevan
(Continued)

FOREIGN PATENT DOCUMENTS

WO 2015128472 9/2015
WO 2015168480 11/2015
WO 2015192091 12/2015

OTHER PUBLICATIONS

International Search Report and Written Opinion of the International Searching Authority dated Oct. 12, 2019 in PCT Application No. PCT/IB2019/051163, 9 pages.

*Primary Examiner* — Cam Linh T Nguyen
(74) *Attorney, Agent, or Firm* — Nicholas Bowman; Andrew D. Wright; Roberts Calderon Safran & Cole, P.C.

(57) ABSTRACT

Systems and methods for dynamic incremental updating of online analytical processing (OLAP) data cubes are disclosed. In embodiments, a computer-implemented method, comprises: receiving real-time transactional event data including a plurality of data fields; identifying aggregate computing functions for each of a plurality of standard query language (SQL) queries of a target data cube to be updated, wherein the target data cube is in a multidimensional form for storing OLAP data in the form of numeric values organized in fields; incrementally calculating the aggregate computing functions based on a current aggregated value obtained from an updated aggregated field database, and a value of one of the plurality of data fields; repeating the incremental calculation for each of the plurality of SQL queries to obtain updated field data for the target data cube; and updating the updated aggregated field database with the updated field data.

20 Claims, 7 Drawing Sheets

(51) Int. Cl.
  *G06F 16/25* (2019.01)
  *G06F 16/22* (2019.01)
  *G06F 16/23* (2019.01)

(56) References Cited

U.S. PATENT DOCUMENTS

| | | |
|---|---|---|
| 8,631,034 B1 * | 1/2014 | Peloski .................. G06F 30/20 |
| | | 707/770 |
| 8,849,745 B2 | 9/2014 | Campbell et al. |
| 9,063,960 B2 | 6/2015 | Mohanty et al. |
| 9,292,573 B2 | 3/2016 | Walker et al. |
| 9,477,745 B2 | 10/2016 | Tyercha et al. |
| 2009/0234710 A1 * | 9/2009 | Belgaied Hassine .. G06Q 30/02 |
| | | 705/7.29 |
| 2010/0228524 A1 | 9/2010 | Bain |
| 2013/0290300 A1 | 10/2013 | Chen et al. |
| 2014/0040237 A1 | 2/2014 | Chen et al. |
| 2014/0136555 A1 | 5/2014 | Jacob et al. |
| 2014/0244701 A1 | 8/2014 | Welton et al. |
| 2014/0351233 A1 | 11/2014 | Crupi et al. |
| 2015/0039555 A1 | 2/2015 | Rao |
| 2015/0074053 A1 | 3/2015 | Sarferaz |
| 2015/0363469 A1 * | 12/2015 | Peloski ............. G06F 16/24556 |
| | | 707/741 |
| 2015/0370882 A1 | 12/2015 | Kalki et al. |
| 2016/0239544 A1 | 8/2016 | Kondo et al. |
| 2016/0283202 A1 | 9/2016 | Sellers-Blais |
| 2017/0017703 A1 | 1/2017 | Schuster et al. |
| 2017/0262495 A1 * | 9/2017 | Peloski ............... G06F 16/2246 |
| 2017/0262503 A1 | 9/2017 | Bellamkonda |
| 2018/0046661 A1 | 2/2018 | Atkins |

* cited by examiner

Aggregate computation for monthly transaction before incoming record #99 — 500

| Cust_id | Gr_id | acc_id | month | counter(card_id) | sum(tra_amt) | min(tra_amt) | max(tra_amt) | Median(tra_amt) |
|---|---|---|---|---|---|---|---|---|
| 101 | 76 | 1013299 | 4 | 764701 | 23,415,016.56 | 10.01 | 14,576.33 | 11,571.78 |

Incoming records for daily transaction - Record #99 — 501

| Cust_id | Gr_id | acc_id | card_id | tra_amt |
|---|---|---|---|---|
| 101 | 76 | 1013299 | 83933 | 14,576.33 |  ← 504

Aggregate computation for monthly transaction after incoming record #99 — 502

| Cust_id | Gr_id | acc_id | month | counter(card_id) | sum(tra_amt) | min(tra_amt) | max(tra_amt) | Median(tra_amt) |
|---|---|---|---|---|---|---|---|---|
| 101 | 76 | 1013299 | 4 | 764702 | 23,422,872.59 | 10.01 | 14,576.33 | 9,713.90 |

Field Updated

Sum Transaction Amount: 23,415,016.56 + 14,576.33 = 23,422,872.59

Median Transaction Amount: Median(7,856.03,11,571.78) = 9,713.90

FIG. 5

DYNAMIC INCREMENTAL UPDATING OF DATA CUBES

BACKGROUND

The present invention relates generally to managing and updating cached data, and more particularly, to dynamic incremental updating of online analytical processing (OLAP) data cubes.

Business Intelligence (BI) is a technology-driven process for analyzing and aggregating data from transactional databases, wherein cubes of data are prepared or refreshed at regular intervals (usually nightly). Online analytical processing (OLAP) is the technology behind many BI applications, wherein one or more computer processors perform a multidimensional analysis of data. All data gathered during OLAP are collected into fact tables. Most customer systems that generate huge amount of data cannot be "transactionally" analyzed or evaluated. Accordingly, OLAP data is typically aggregated into OLAP data cubes. OLAP data cubes generated during this process may be exposed as dashboards or reports to product managers or customer segments for them to glean business insights. Examples of data that may be analyzed via OLAP include click stream data from web logs of online portals and search engines, banking transactions, store logistics, point of sale data, etc., which are then exposed as reports to users. Typically, one or more processors execute a batch job to read transactional data, mine data logs, perform calculations, summations, aggregations, etc., and load results into OLAP data cubes on a nightly, weekly, monthly, or yearly basis.

SUMMARY

In an aspect of the invention, a computer-implemented method includes: receiving, by an event processor, real-time transactional event data from one or more remote transaction computing devices, the real-time transactional event data including a plurality of data fields containing values; identifying, by an aggregate computing engine, aggregate computing functions for each of a plurality of standard query language (SQL) queries of a target data cube to be updated, wherein the target data cube is in a multidimensional form for storing online analytical processing (OLAP) data in the form of numeric values organized in fields; incrementally calculating, by the aggregate computing engine, the aggregate computing functions based on a current aggregated value obtained from an updated aggregated field database, and a value of one of the plurality of data fields; repeating, by the aggregate computing engine, the incremental calculation for each of the plurality of SQL queries to obtain updated field data for the target data cube; and updating the updated aggregated field database with the updated field data, wherein the receiving the real-time transactional event data and the incrementally calculating the aggregate computing functions is performed dynamically in an ongoing basis.

In another aspect of the invention, there is a computer program product for dynamic incremental updating of online analytical processing (OLAP) data cubes. The computer program product comprises a computer readable storage medium having program instructions embodied therewith. The program instructions are executable by a computing device to cause the computing device to: identify aggregate computing functions for each of a plurality of standard query language (SQL) queries of a target data cube to be updated, wherein the target data cube is in a multidimensional form for storing OLAP data in the form of numeric values organized in fields; incrementally calculate the aggregate computing functions based on a current aggregated value obtained from an updated aggregated field database, and a value of one of a plurality of data fields obtained from real-time transactional event data; repeat the incremental calculation for each of the plurality of SQL queries to obtain updated field data for the target data cube; and update the updated aggregated field database with the updated field data, wherein incrementally calculating the aggregate computing functions and updating the updated aggregated field database are performed dynamically in an ongoing basis.

In another aspect of the invention, there is a system for dynamic incremental updating of online analytical processing (OLAP) data cubes. The system includes: a CPU, a computer readable memory and a computer readable storage medium associated with a computing device; program instructions to identify aggregate computing functions for each of a plurality of standard query language (SQL) queries of a target data cube to be updated, wherein the target data cube is in a multidimensional form for storing OLAP data in the form of numeric values organized in fields; program instructions to incrementally calculate the aggregate computing functions based on a current aggregated value obtained from an updated aggregated field database, and a value of one of a plurality of data fields obtained from real-time transactional event data; program instructions to repeat the incremental calculation for each of the plurality of SQL queries to obtain updated field data for the target data cube; and program instructions to update the updated aggregated field database with the updated field data, wherein incrementally calculating the aggregate computing functions and updating the updated aggregated field database are performed dynamically in an ongoing basis, and wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 5 is an illustrative example of incremental aggregation of computer functions in accordance embodiments of the invention.

DETAILED DESCRIPTION

Figure 1:
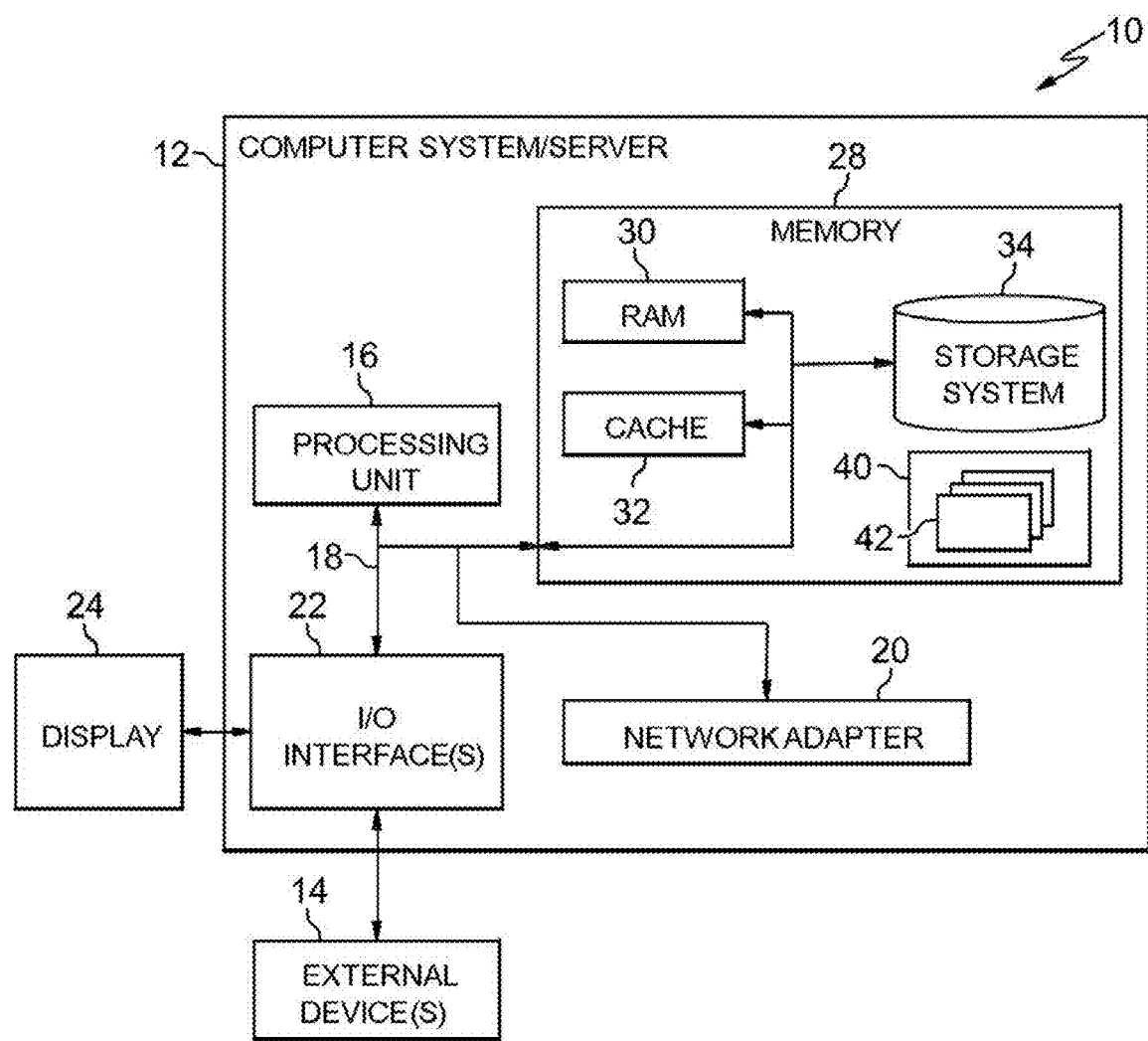
FIG. 1 depicts a computing infrastructure according to an embodiment of the present invention.

The present invention relates generally to managing and updating cached data, and more particularly, to dynamic incremental updating of online analytical processing (OLAP) data cubes. As noted above, typically, one or more online analytical processing (OLAP) computer processors execute a batch job to read transactional data, mine data logs, perform calculations, summations, aggregations, etc., and load results into OLAP data cubes on a nightly, weekly, monthly, or yearly basis. Such batch jobs are highly resource intensive as huge data sets sometimes amounting to hundreds of terabytes of data are read from disk, loaded onto memory structures, utilized in data calculation, and loaded into target data cubes. Typically, batch OLAP updates are performed during off-peak hours so that database performance is not affected during peak business hours. However, as the amount of data to be analyzed increases, the time required to process these large data sets also increases and may run over into regular or peak business hours, causing processing outages that may result in major business problems. As a result, it is typical for scheduling of batch jobs to be constantly shrunk, whereby the OLAP computing system is always trying to catch up on the processing of batch jobs.

An alternative solution to the problem of large data sets is for an OLAP computing system to transfer data to another server to do the processing. This approach requires additional hardware, software and maintenance effort and increases the overall OLAP costs. Some have attempted to address this problem by increasing computer power and delegating aggregation jobs to data clusters on big data platforms (e.g., Apache Hadoop™). This solution requires transferring huge amounts of data from relational database management systems (RDBMS) to Hadoop Distributed File System (HDFS) based clusters. This solution also requires a large investment in terms of hardware and software to prepare these HDFS clusters. File offloading and transfer for this solution is also a time consuming step, and does not address the root cause of problem, nor provide a scalable solution.

Presently, there is no mechanism to incrementally and accurately keep OLAP data cubes up-to-date based on the transactional feeds (incoming transactional data). Advantageously, embodiments of the invention add functionality to OLAP computing systems using specialized computing devices with inventive programming to perform incremental OLAP data cube updates based on real-time transactional event data. The real-time transactional event data may be obtained on a continuous basis as the data is generated. In aspects, embodiments of the invention provide a scalable method to solve the technical problem of resource-intensive OLAP batch jobs and OLAP data cube generation. Embodiments of the invention utilize new types of data (e.g., identifying target OLAP data cubes for updating) utilizing new processes (e.g., comparing non-aggregated real-time incoming field data with aggregated field data to produce updated OLAP data cubes). In embodiments, OLAP computing systems enable the direct generation of reports and/or dashboards from continuously updated aggregated data cubes. Moreover, embodiments of the invention constitute an improvement to OLAP computer systems, since OLAP computing systems in accordance with aspects of the present invention require less processing resources compared to traditional batch-type OLAP computing systems. That is, embodiments of the invention eliminate the need to execute huge batch jobs to construct entire OLAP data cubes from scratch each time a job runs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
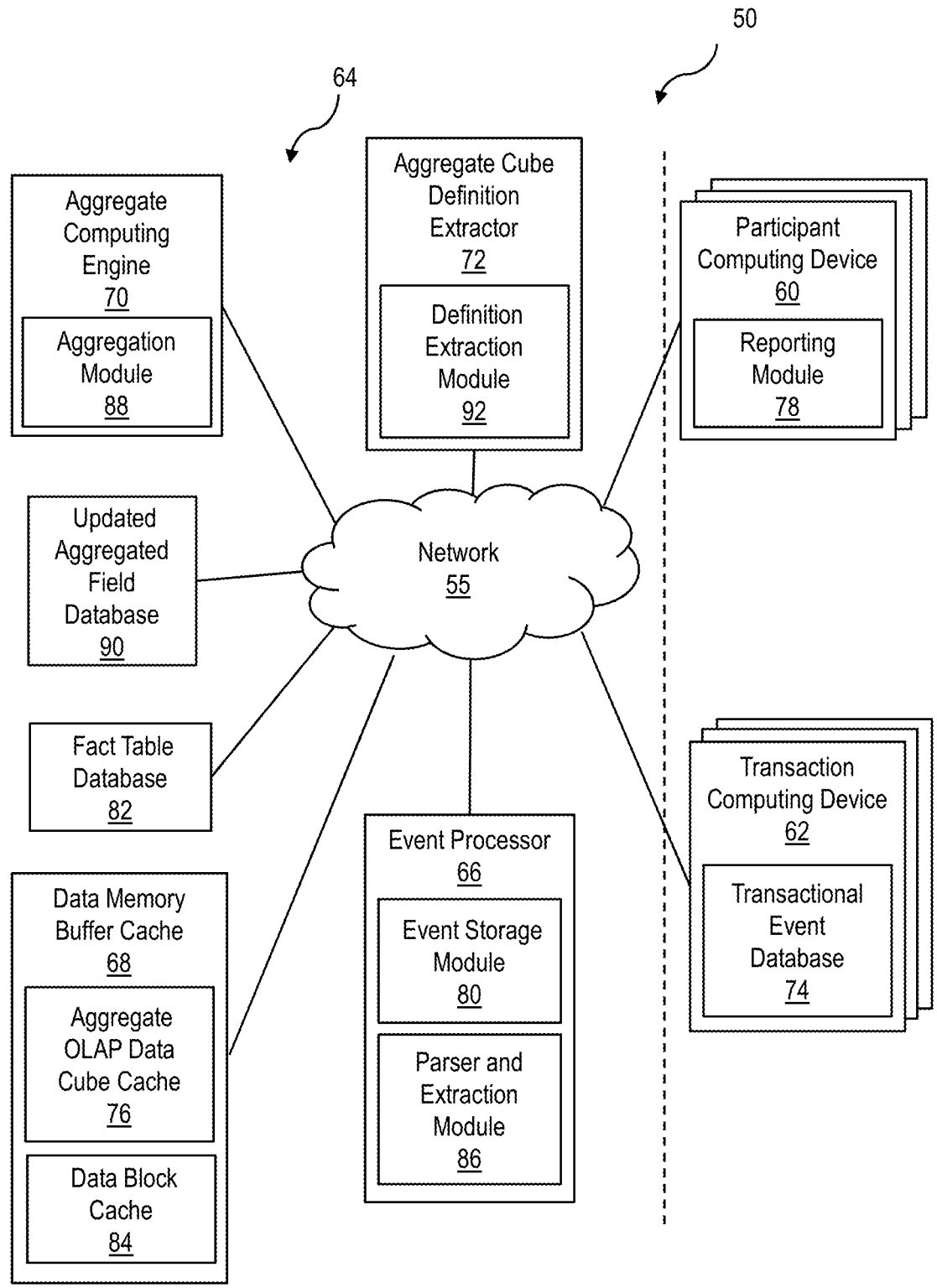
FIG. 2 shows an exemplary environment in accordance with aspects of the invention.

FIG. 2 shows an exemplary online analytical processing (OLAP) environment 50 in accordance with aspects of the invention. The OLAP environment 50 includes a network 55 in communication with one or more participant computing devices 60, one or more transaction computing devices 62 and an OLAP computing system 64 (shown separated from the participant computing device 60 and transaction computing device 62 by a dashed line). The exemplary OLAP computing system 64 shown comprises an event processor 66, a data memory buffer cache 68, an aggregate computing engine 70, and an aggregate cube definition extractor 72. The OLAP computing system 64 may comprise at least one computer system 12 of FIG. 1, and the at least one computer system 12 may be connected to the network 55 via the network adapter 20 of FIG. 1. The OLAP computing system 64 may be configured as one or more special purpose computing devices that are part of a business intelligence system infrastructure. For example, the OLAP computing system 64 may be configured to analyze real-time transactional event data from a transactional event database 74 of a remote transaction computing device 62 to generate incremental OLAP data cube updates for storage in an aggregate OLAP data cube cache 76 of the data memory buffer cache 68. The OLAP computing system 64 may be configured to communicate with plural different participant computing devices 60 and transaction computing devices 62 simultaneously, to provide customer-specific updated OLAP data cubes to reporting modules 78 of the respective participant computing devices 60.

The network 55 may be any suitable communication network or combination of networks, such as a local area network (LAN), a general wide area network (WAN), and/or a public network (e.g., the Internet). The participant computing device 60 may be in the form of the computing device 12 of FIG. 1, and may be a desktop computer, laptop computer, tablet computer, smartphone, etc. In embodiments, the participant computing device 60 runs an application program via the reporting module 78 to provide business intelligence data in the form of reports and/or dashboards to users.

Still referring to FIG. 2, the event processor 66 may comprise a plurality of computing modules configured to perform one or more of the functions described herein, wherein the computing modules may include one or more program modules (e.g., program module 42 of FIG. 1) executed by the event processor 66. In embodiments, an event storage module 80 of the event processor 66 is configured to receive real-time transactional event data from one or more transaction computing devices 62, and store the transactional event data in one or more fact tables in a fact table database 82. Data from the fact table database 82 may be utilized to update a data block cache 84 of the data memory buffer cache 68. In aspects, a parser and extraction module 86 of the event processor 66 parses the incoming transactional event data and extracts data fields for transmission to the aggregate computing engine 70.

With continued reference to FIG. 2, the aggregate computing engine 70 may include an aggregation module 88 configured to perform one or more of the functions described herein, wherein the aggregation module 88 may include one or more program modules (e.g., program module 42 of FIG. 1) executed by the aggregate computing engine 70. In embodiments, the aggregation module 88 is configured to obtain a list of data cubes by standard query language (SQL) query (SQL code), identify aggregate computer functions (e.g., SUM, MIN, MAX, AVERAGE, MEDIAN, VARIANCE, etc.) to perform for each SQL query, and incrementally calculate the aggregations (performs the aggregate computer functions) using a current aggregated value in an updated aggregated field database 90 and a value of an incoming field (from incoming transactional event data). In aspects, the aggregation module 88 updates aggregated fields in the updated aggregated field database 90 based on the incremental calculations. In embodiments, the aggregation module 88 obtains an SQL query from the aggregate cube definition extractor 72.

Still referencing FIG. 2, the aggregate cube definition extractor 72 may include a definition extraction module 92 configured to perform one or more of the functions described herein, wherein the definition extraction module 92 may include one or more program modules (e.g., program module 42 of FIG. 1) executed by the aggregate cube definition extractor 72. In embodiments, the definition extraction module 92 extracts OLAP data cube definitions from the updated aggregated field database 90, and supplies the OLAP data cube definitions to the aggregate computing engine 70.

In embodiments, the OLAP computing system 64 may include additional or fewer components than those shown in FIG. 2. In embodiments, separate components may be integrated into a single computing component or module. Additionally, or alternatively, a single component may be implemented as multiple computing components or modules.

Moreover, the quantity of devices and/or networks in the OLAP environment 50 is not limited to what is shown in FIG. 2. In practice, the OLAP environment 50 may include additional devices and/or networks; fewer devices and/or networks; different devices and/or networks; or differently arranged devices and/or networks than illustrated in FIG. 2. In addition, in some implementations, one or more of the devices of the OLAP environment 50 may perform one or more functions described as being performed by another one or more of the devices of the OLAP environment 50. Devices of the OLAP environment 50 may interconnect via wired connections, wireless connections, or a combination of wired and wireless connections.

FIG. 3 shows a flowchart of a method in accordance with aspects of the invention. Steps of the method of FIG. 3 may be performed in the OLAP environment 50 illustrated in FIG. 2, and are described with reference to elements shown in FIG. 2.

At step 300, the event processor 66 receives real-time transactional event data from one or more transaction computing devices 62. In embodiments, the event storage module 80 of the event processor 66 receives the real-time transactional event data. The transactional event data may comprise, for example, clickstream data from web logs of online portals or search engines, banking transactions, store logistics, point of sales data, etc. In aspects, the transactional event data comprises real-time event data, not aggregated data collected over time. Step 300 may comprise the receipt of real-time transactional event data from multiple sources (e.g., remote transaction computing devices). In embodiments, step 300 is performed on a continuous, not a periodic, basis.

At step 301, the event processor 66 extracts individual field data from the incoming transactional event data and stores the transactional event data in one or more fact tables of the fact table database 82. In embodiments, the event storage module 80 of the event processor 66 performs step 301. In aspects, the event storage module 80 stores the transactional event data in the fact table database 82 based on a list of predetermined target OLAP data cubes (hereafter "data cubes") and their constituent SQL queries. As used herein the term data cube (OLAP data cube or target data cube) refers to a method of storing data in a multidimensional form for reporting purposes, wherein the data cube contains numeric values representative of facts of interest to users, which are organized in data fields (data field of interest). Data fields of interest to the event processor 66 may constitute all available data fields in the transactional event data or may constitute less than all of the available data fields in the transactional event data. An exemplary fact table is shown in Table 1 below for illustrative purposes.

TABLE 1

Fact Table

| Table Name | Column Name | Column Name | Column Name | Column Name | Column Name | Column Name | Column Name | Column Name |
|---|---|---|---|---|---|---|---|---|
| cust_locker | cust_id | Br_id | acc_id | lock_id | locker_charges | | | |
| cut_tran_chg | cust_id | Br_id | acc_id | tran_id | tran_chr_amt | | | |
| cust_cheqye_tran | cust_id | Br_id | acc_id | chq_id | chq_amt | | | |
| Dailytransaction | cust_id | Br_id | acc_id | card_id | tra_amt | tra_type | ATM_id | merchant_Id |
| Cust_FD | cust_id | Br_id | acc_id | FD_no | FD_amt | | | |
| cust_invst | cust_id | Br_id | acc_id | invst_id | invst_amt | | | |

At step 302, most recently used (MRU) data from the fact table database 82 may be stored in the data block cache 84 of the data memory buffer cache 68. In embodiments, the data memory buffer cache 68 determines the MRU data from the fact table database 82 and stores it in the data block cache 84. Conventional MRU data storage techniques may be utilized in the performance of step 302.

At step 303, the aggregate computing engine 70 obtains a list of target data cubes to compute, each associated with at least one SQL query. For example, the aggregate computing engine 70 may determine that one data cube is to be computed, wherein the data cube has 10 SQL queries associated therewith. The aggregate computing engine 70 may determine the list of data cubes from a predetermined list of data cubes stored in the aggregate computing engine 70, or a list of data cubes received from a remote computing device (e.g., transaction computing device 62).

At step 304, the aggregate cube definition extractor 72 extracts a list of SQL queries and their definitions from the updated aggregated field database 90 based on the list of target data cubes obtained at step 303. That is, for each target data cube that needs to be computed, the aggregate cube definition extractor 72 extracts a list of associated SQL query definitions identifying the type of computations needed. In embodiments, the aggregate cube definition extractor 72 identifies relationships between the updated aggregated field database 90 and aggregate data cube definitions. If one or more relationships exist between the updated aggregated field database 90 and the data cube definitions, the aggregate computing engine 70 performs online computation/incremental aggregation to update the aggregate OLAP data cube cache 76, as detailed in steps 305-307 below.

At step 305, the aggregate computing engine 70 identifies a list of aggregate computing functions for each SQL query extracted at step 304, based on the definitions extracted at step 304. That is, the aggregate computing engine 70 receives the SQL query definitions from the aggregate cube definition extractor 72 at step 305, and based thereon, identifies the list of aggregate computing functions for each SQL query of a target data cube. The number and type of aggregate computing functions may vary, and may include computing functions typically performed during business intelligence analysis, such as SUM, MINIMUM (MIN), MAXIMUM (MAX), AVERAGE (AVG), MEDIAN, VARIANCE, etc.

At step 306, for each field in an SQL query, the aggregate computing engine 70 incrementally calculates the aggregate computing functions (identified at step 305) using a current aggregate value from the updated aggregated field database 90 and a value of the incoming individual field. The aggregate computing engine 70 may obtain the current aggregate value from the updated aggregated field database 90 and compare the current aggregate value with the associated incoming individual field value received at step 300. For example, for an aggregate computer function of MIN (i.e., calculate the minimum value), the aggregate computing engine 70 may check if the incoming individual field value is less than a current MAX value in the updated aggregated field database 90. In another example, to calculate MAX (i.e., calculate the maximum value), the aggregate computing engine 70 may check if the incoming individual field value is greater than the current MAX value in the updated aggregated field database 90. In still another example, to calculate AVG, the aggregate computing engine 70 may re-computer the average using: (current AVG+incoming individual field value)÷(current row count+1).

At step 307, the aggregate computing engine 70 updates aggregated fields in the updated aggregated field database 90 based on the incremental calculations performed at step 306. In embodiments, the aggregation module 88 performs step 307.

At step 308, steps 303-307 are repeated for each target data cube obtained at step 303. It should be understood that steps 303-307 may be performed simultaneously for multiple target data cubes of interest (target data cubes to be computed by the OLAP computing system 64).

Figure 3A:
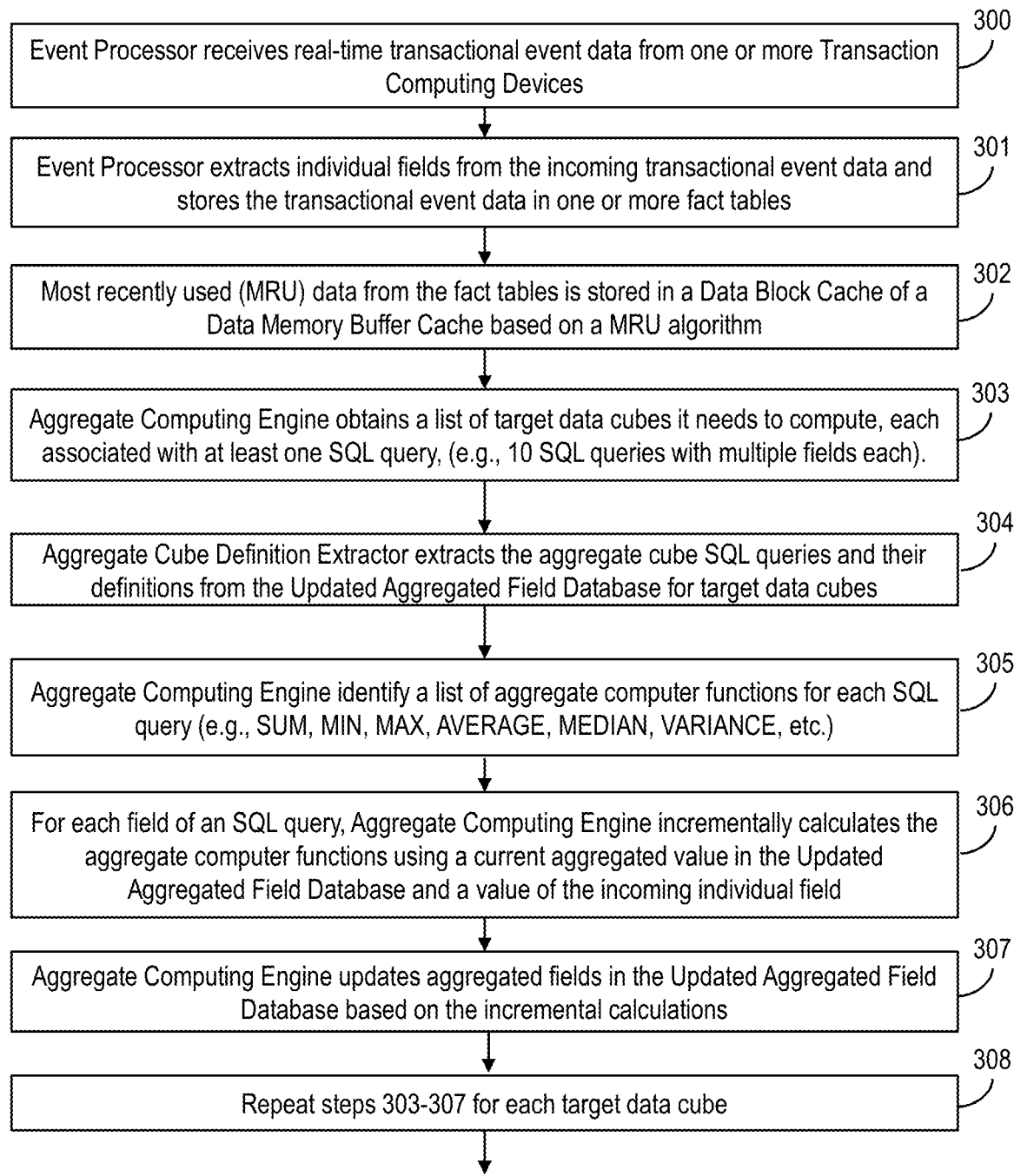
FIGS. 3A and 3B show a flowchart of steps of a method in accordance with aspects of the invention.
Figure 3B:
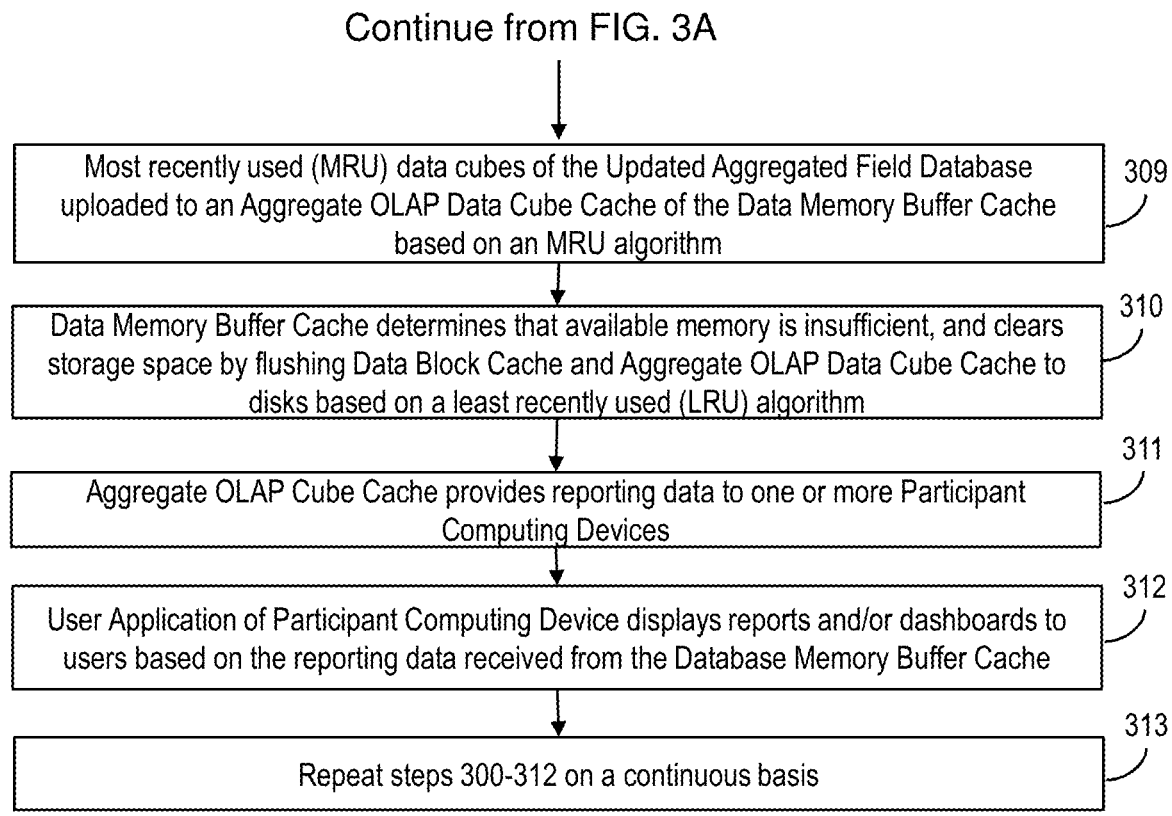

Turning to FIG. 3B, the method of FIG. 3A continues at step 309. At step 309, the MRU data cubes of the updated aggregated field database 90 are uploaded to the aggregate OLAP data cube cache 76 of the data memory buffer cache 68 based on an MRU algorithm. Step 309 may be implemented by the data memory buffer cache 68 in an ongoing basis. In aspects, the aggregate OLAP data cube cache 76 is accessible by one or more third parties (e.g., participant computing devices 60).

At step 310, the data memory buffer cache 68 determines that available memory is insufficient, and clears storage space in the data memory buffer cache 68 based on a least recently used (LRU) algorithm. The data memory buffer cache 68 may utilize existing memory clearing methods and tools in the implementation of step 310.

At step 311, the aggregate OLAP data cube cache 76 provides reporting data in the form of updated data cubes to one or more participant computing devices 60. In embodiments, one or more participant computing device 60 access the aggregate OLAP data cube cache 76 on a periodic basis to obtain updated data cubes of interest to the participant. In embodiments, the aggregate OLAP data cube cache 76 sends reporting data on a periodic basis to one or more participant computing devices 60.

At step 312, the reporting module 78 of the participant computing device 60 utilizes a program application to generate and display reports and/or dashboards to a user based on the reporting data obtained at step 311. A plurality of existing business intelligence reporting techniques may be utilized in the implementation of step 312.

At step 313, steps 300-312 are repeated on a continuous basis. Accordingly, the method of FIGS. 3A and 3B enable continuous incremental updating of OLAP data cubes to provide up-to-date business intelligence without the delays associated with large batch processing of business intelligence data. While steps of FIGS. 3A and 3B are described as being performed by the event processor 66, aggregate computing engine 70, and aggregate cube definition extractor 72, it should be understood that various elements of the OLAP environment 50 may perform multiple method steps of the invention.

Figure 4:
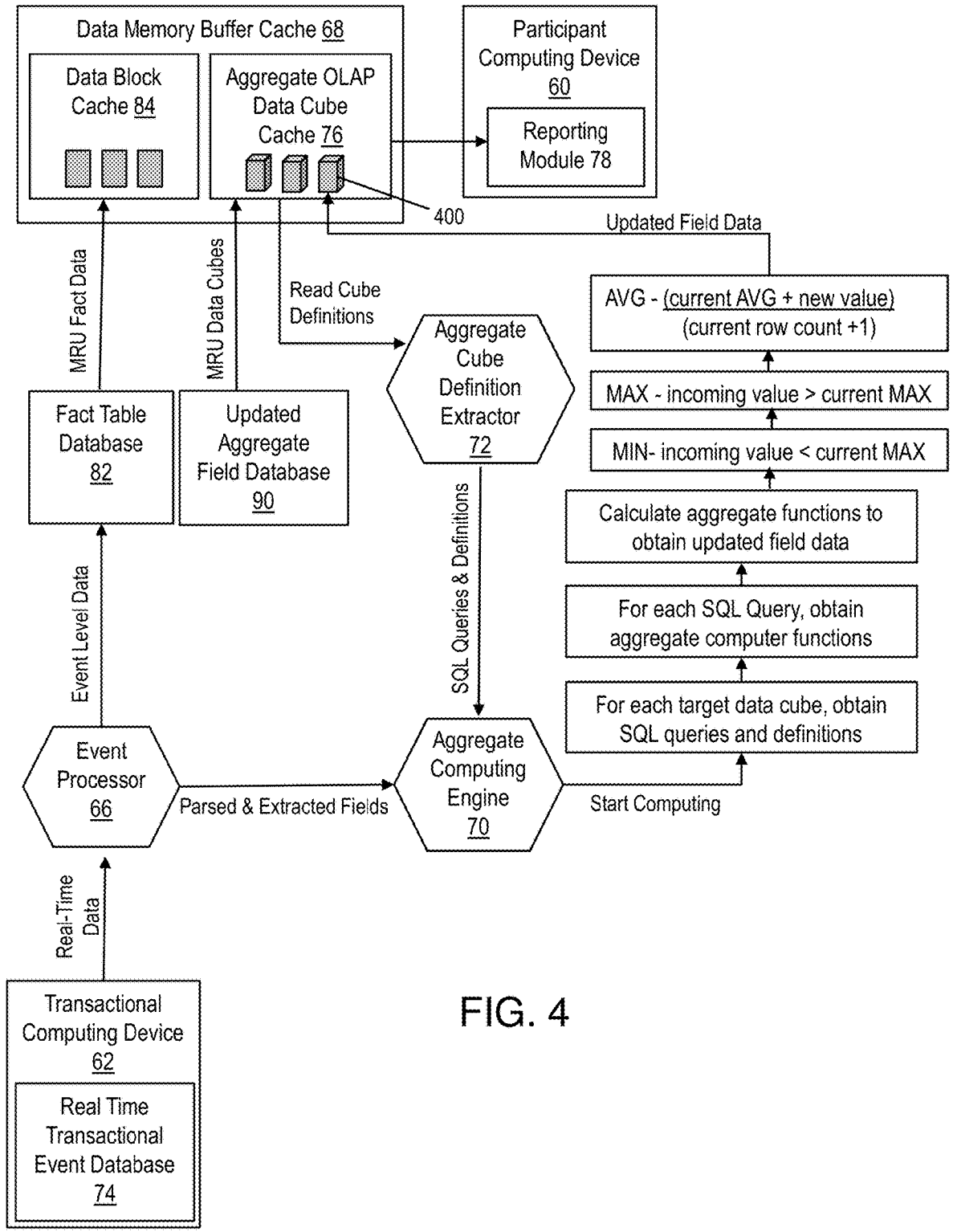
FIG. 4 shows a flow diagram for exemplary methods in accordance with aspects of the invention.

FIG. 4 shows a flow diagram for exemplary methods in accordance with aspects of the present invention. Steps represented in FIG. 4 are set forth in FIGS. 3A and 3B. As illustrated in FIG. 4, real-time transactional event data is continuously fed to the event processor 66, which parses the data and extracts individual field data for use by the aggregate computing engine 70, e.g., as described at steps 300 and 301 of FIG. 3A. The field data extracted from the real-time transaction event data may be stored in the fact table database 82 in accordance with step 301 of FIG. 3A, and MRU fact data from the fact table database 82 is cached in the data block cache 84 in accordance with step 302 of FIG. 3A. The aggregate cube definition extractor 72 reads target data cube definitions in the aggregate OLAP data cube cache 76 and feeds SQL queries and definitions to the aggregate computing engine 70, e.g., as described at step 304 of FIG. 3A. The aggregate computing engine 70 utilizes the SQL queries and definitions associated with target data cubes to compute updates for the target data cubes. Specifically, for each target data cube, the aggregate computing engine 70 obtains the associated SQL queries, identifies the aggregate computer functions for each SQL query, and calculates each aggregate function (e.g., Min, MAX, AVG) to obtain updated field data, e.g., as described at steps 305-306 of FIG. 3A. Updated field data is then cached with the appropriate data cube 400 in the aggregate OLAP data cube cache 76, where it can be accessed at any time by one or more participant computing devices 60, e.g., as described at step 311 of FIG. 3A. Advantageously, with embodiments of the present invention, there is no need to execute huge batch jobs that will construct entire data cubes from scratch each time an OLAP job runs. Embodiments of the invention enable OLAP data cube aggregations to occur in real time. As a result, business intelligence is available at near real-time speeds and without huge amounts of computational and storage resources that traditional aggregate computation jobs rely heavily on.

FIG. 5 is an illustrative example of incremental aggregation of computer functions in accordance embodiments of the invention. Aggregations of FIG. 5 may be performed using the methods discussed with respect to FIGS. 3A and 3B.

Table 500 represents aggregate computations for monthly bank transactions before the OLAP computing system 64 processes an incoming transactional event record #99, wherein table 500 is stored in the updated aggregated field database 90. Table 501 represents the incoming transactional event record #99 for a daily bank transaction extracted by the event processor 66 in accordance with step 301 of FIG. 3A and stored in the fact table database 82. Table 502 represents aggregate computations for monthly bank transactions after the OLAP computing system 64 processes the incoming transactional event record #99. In this example, the aggregate computing engine 70 incrementally calculates the aggregate computer functions SUM (summation) and MEDIAN using current aggregate values from the updated aggregated field database 90 represented by table 500 and values from the incoming field tra_amt shown at 504, e.g., as described at step 306 of FIG. 3A. As depicted in FIG. 5, the aggregate computing engine 70 performs a summation function wherein a transaction amount of 23,415,016.56 from table 500 is added to a new transaction amount 14,576.33 of Table 5 to give a total transaction amount of 23,422,872.59. Accordingly, the sum(tra_amt) field in table 502 is updated with the new transaction amount 23,422,872.59 in accordance with step 307 of FIG. 3A. Likewise, the aggregate computing engine 70 performs a median function wherein a medium transaction amount of 11,571.78 of table 500 and the transaction amount 14,576.33 of table 501 are utilized to calculate a new median transaction amount of 9,713.90. Accordingly, the median(tra_amt) field in table 502 is updated with the new median transaction amount of 9,713.90 in accordance with step 307 of FIG. 3A.

Figure 6:
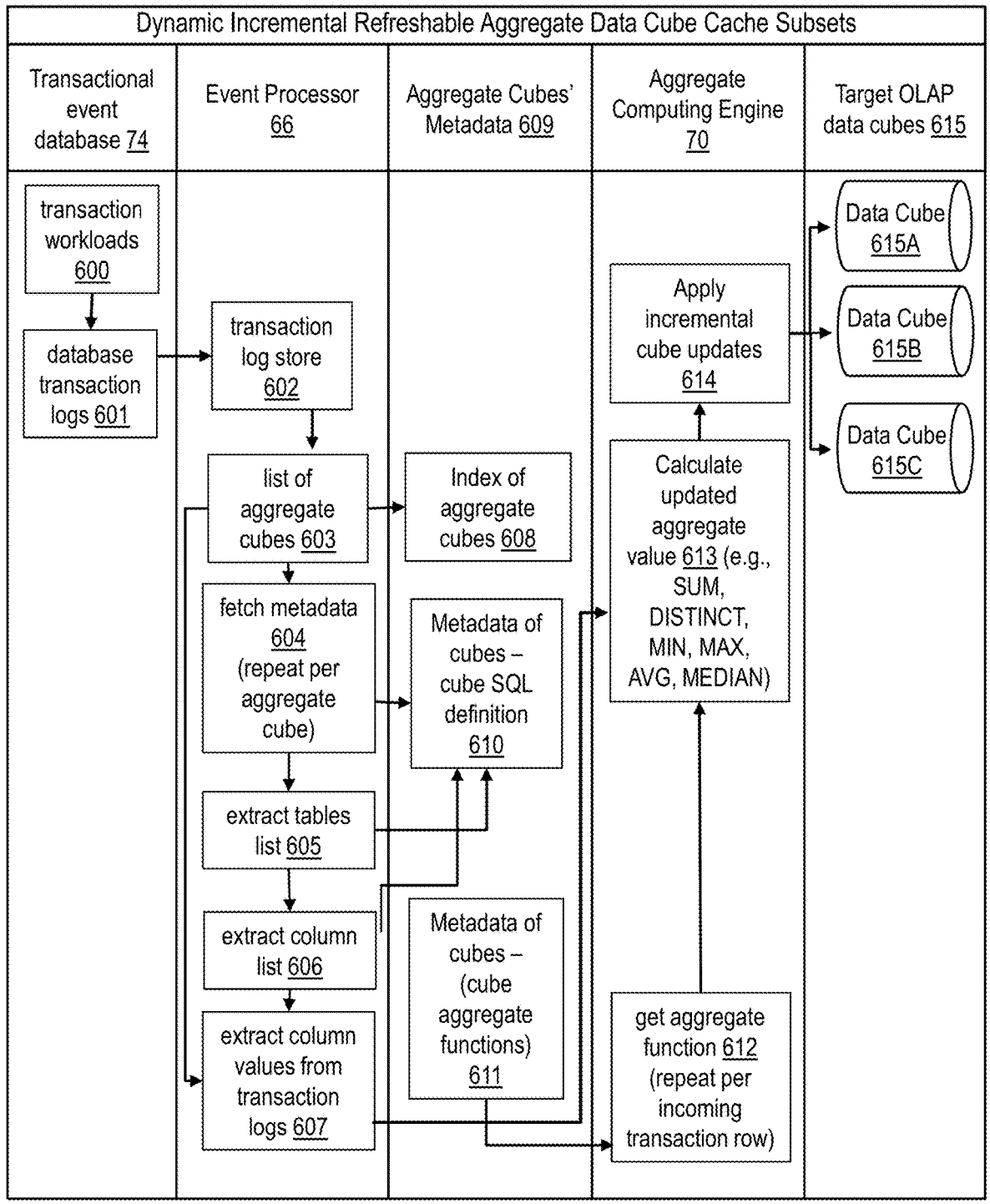
FIG. 6 is a block diagram of dynamic incremental refreshable data cube cache subsets.

FIG. 6 is a block diagram of dynamic incremental refreshable data cube cache subsets. The block diagram of FIG. 6 can be performed utilizing the components of OLAP environment 50 of FIG. 2.

FIG. 6 illustrates subsets of the transactional event database 74, including transaction workloads 600 and database transaction logs 601. Data from the database transaction logs 601 of the transactional event database 74 can be stored in the transaction log store 602 of the event processor 66. A list of target aggregate cubes 603 obtained from the transaction log store 602 at the event processor 66 is utilized for the fetch metadata 604, which is utilized by the extract tables list 605. At 607 column values from transaction logs are extracted based on the extract column list 606 and the list of target aggregate cubes 603. The list of target aggregate cubes 603 is utilized in an index of aggregate cubes 608 in the column entitled aggregate cubes' metadata 609. At 610, metadata of cubes and cube SQL definitions are obtained from fetch metadata 604, extract tables list 605, and extract column list 606. At 612, the aggregate computing engine 70 obtains aggregate functions (e.g., SUM, DISTINCT, MIN, MAX, AVG, MEDIAN, etc.) from metadata of the cubes 611 for each incoming field transaction row. At 613 updated aggregate values are calculated by the aggregate computing engine 70. At 614 incremental cube updates 614 are applied to respective target data cubes 615, represented by data cubes 615a, 615b and 615c.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamic incremental updating of online analytical processing (OLAP) data cubes. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving real-time transactional event data from one or more remote transaction computing devices, the real-time transactional event data including a plurality of data fields containing values;
identifying aggregate computing functions for each of a plurality of standard query language (SQL) queries of a target data cube to be updated, wherein the target data cube is in a multidimensional form for storing online analytical processing (OLAP) data in the form of numeric values organized in fields;
incrementally calculating the aggregate computing functions based on a current aggregated value obtained from an updated aggregated field database, and a value of one of the plurality of data fields;
repeating the incremental calculation for each of the plurality of SQL queries to obtain updated field data for the target data cube; and
updating the updated aggregated field database with the updated field data,
wherein the receiving the real-time transactional event data and the incrementally calculating the aggregate computing functions is performed dynamically in an ongoing basis.

2. The method of claim 1, further comprising extracting the plurality of data fields from the real-time transactional event data.

3. The method of claim 2, further comprising updating a fact table database with the plurality of data fields.

4. The method of claim 1, further comprising identifying the target data cube to be updated.

5. The method of claim 1, further comprising extracting definitions of the SQL queries from the updated aggregated field database.

6. The method of claim 1, further comprising providing a remote participant computing device with reporting data from the updated aggregated field database for use in a business intelligence report.

7. A computer program product for dynamic incremental updating of online analytical processing (OLAP) data cubes, the computer program product comprising a computer readable storage medium having program instructions embodied therewith, the program instructions executable by a computing device to cause the computing device to:
identify aggregate computing functions for each of a plurality of standard query language (SQL) queries of a target data cube to be updated, wherein the target data cube is in a multidimensional form for storing OLAP data in the form of numeric values organized in fields;
incrementally calculate the aggregate computing functions based on a current aggregated value obtained from an updated aggregated field database, and a value of one of a plurality of data fields obtained from real-time transactional event data;
repeat the incremental calculation for each of the plurality of SQL queries to obtain updated field data for the target data cube; and
update the updated aggregated field database with the updated field data,
wherein incrementally calculating the aggregate computing functions and updating the updated aggregated field database are performed dynamically in an ongoing basis.

8. The computer program product of claim 7, wherein the program instructions further cause the computing device to receive the real-time transactional event data from one or more remote transaction computing devices on a continuous basis as the transactional event data is generated.

9. The computer program product of claim 8, wherein the program instructions further cause the computing device to extract the plurality of data fields from the real-time transactional event data.

10. The computer program product of claim 9, wherein the program instructions further cause the computing device to update a fact table database with the plurality of data fields.

11. The computer program product of claim 7, wherein the program instructions further cause the computing device to identify the target data cube to be updated.

12. The computer program product of claim 7, wherein the program instructions further cause the computing device to extract definitions of the SQL queries from the updated aggregated field database.

13. The computer program product of claim 7, wherein the program instructions further cause the computing device to provide a remote participant computing device with reporting data from the updated aggregated field database for use in a business intelligence report.

14. A system for dynamic incremental updating of online analytical processing (OLAP) data cubes, comprising:
   a computer processing unit (CPU), a computer readable memory and a computer readable storage medium associated with a computing device;
   program instructions to identify aggregate computing functions for each of a plurality of standard query language (SQL) queries of a target data cube to be updated, wherein the target data cube is in a multidimensional form for storing OLAP data in the form of numeric values organized in fields;
   program instructions to incrementally calculate the aggregate computing functions based on a current aggregated value obtained from an updated aggregated field database, and a value of one of a plurality of data fields obtained from real-time transactional event data;
   program instructions to repeat the incremental calculation for each of the plurality of SQL queries to obtain updated field data for the target data cube; and
   program instructions to update the updated aggregated field database with the updated field data,
   wherein incrementally calculating the aggregate computing functions and updating the updated aggregated field database are performed dynamically in an ongoing basis, and
   wherein the program instructions are stored on the computer readable storage medium for execution by the CPU via the computer readable memory.

15. The system of claim 14, wherein the program instructions further cause the computing device to receive the real-time transactional event data from one or more remote transaction computing devices on a continuous basis as the transactional event data is generated.

16. The system of claim 15, wherein the program instructions further cause the computing device to extract the plurality of data fields from the real-time transactional event data.

17. The system of claim 16, wherein the program instructions further cause the computing device to update a fact table database with the plurality of data fields.

18. The system of claim 14, wherein the program instructions further cause the computing device to identify the target data cube to be updated.

19. The system of claim 14, wherein the program instructions further cause the computing device to extract definitions of the SQL queries from the updated aggregated field database.

20. The system of claim 14, wherein the program instructions further cause the computing device to provide a remote participant computing device with reporting data from the updated aggregated field database for use in a business intelligence report.

* * * * *